No. 680,792. Patented Aug. 20, 1901.
B. G. LAMME.
ALTERNATING CURRENT INDUCTION MOTOR.
(Application filed May 24, 1899.)

(No Model.)

WITNESSES:
Ethan T. Dodds
H. C. Tener

INVENTOR
Benjamin G. Lamme
BY
Wesley G. Carr
ATTORNEY.

THE NORRIS PETERS CO., PHOTO-LITHO., WASHINGTON, D. C.

United States Patent Office.

BENJAMIN G. LAMME, OF PITTSBURG, PENNSYLVANIA, ASSIGNOR TO THE WESTINGHOUSE ELECTRIC & MANUFACTURING COMPANY, OF PENNSYLVANIA.

ALTERNATING-CURRENT INDUCTION-MOTOR.

SPECIFICATION forming part of Letters Patent No. 680,792, dated August 20, 1901.

Application filed May 24, 1899. Serial No. 718,059. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Alternating-Current Induction-Motors, (Case No. 832,) of which the following is a specification.

My invention relates to that class of alternating-current electric motors, generally known as "induction-motors," in which a rotating field is produced by out-of-phase currents supplied to the winding or windings of one member only, whereby mechanical rotation of the movable member of the motor is effected.

The object of my invention is to provide a motor of the class indicated which may be operated economically at variable speeds, and with this end in view I have devised the means shown in the accompanying drawings, in which—

Figure 1:
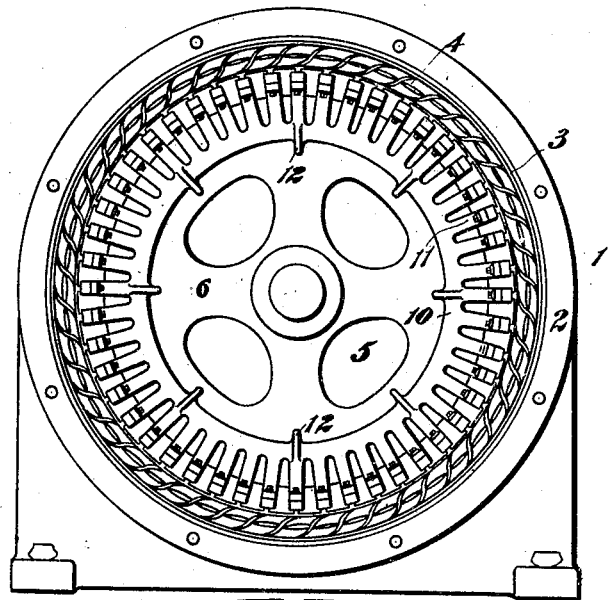
Figure 2:
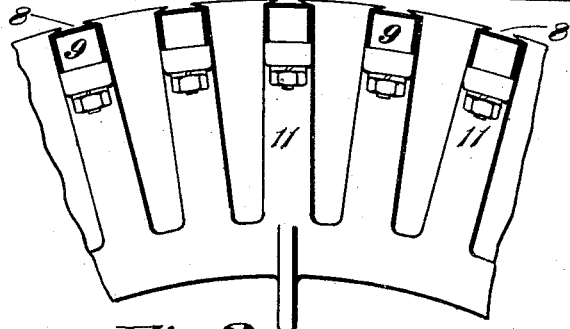
Figure 3:
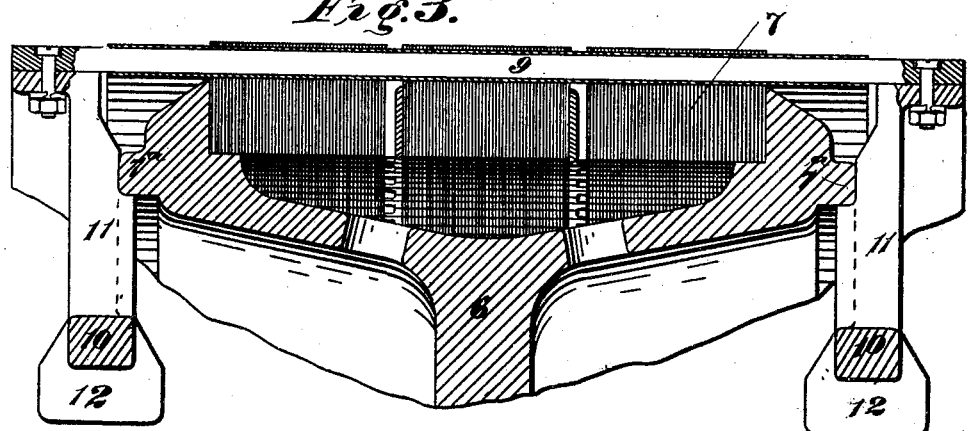

Figure 1 is an end elevation of a motor constructed in accordance with my invention, one of the end plates being removed. Fig. 2 is a detail end view, on a larger scale, of a portion of the secondary member of the motor; and Fig. 3 is a detail sectional view of a portion of the secondary member.

In motors of this general class, variations in the speed of which are effected by varying the electromotive forces applied to the primary members, it is necessary or at least desirable for satisfactory operation that the secondary members should have windings of relatively high resistance.

In order to avoid complication of structure and liability to disarrangement in operation, it is desirable to dispense with collector-rings and short-circuiting devices such as have been sometimes employed for automatically cutting out the major portion of the secondary resistance for high speeds. If such features are dispensed with and the resistance be therefore permanently included in circuit, the resistance must be capable of taking care of comparatively high losses at low speeds, since the losses in the secondary for any given torque are proportional to the slip or the drop in speed. If low-speed running occurs at more or less frequent intervals during a given period of operation, it is desirable to store the heat due to the secondary losses during such low-speed running and to dissipate it during the times when the motor is running at higher speeds, and consequently when it is subject to a lesser degree of loss in its secondary winding. In order to dissipate the heat at low speeds, it is necessary to make the end rings of comparatively small dimensions, such as would be suitable for normal high-speed operation. If a motor that is provided with such rings be operated for a considerable length of time at a low speed, the heat generated in the rings is likely to be so intense as to destroy or to at least seriously impair them. On the other hand, if the rings be made of sufficient size to store the heat generated in them, they will operate without danger of injury until an increase of speed reduces the heat-generating action and permits of dissipation of the stored heat. Under such conditions the secondary resistance constitutes, in effect, a heat fly-wheel, which tends to promote a maximum degree of economy in the operation of the motor. The section, material, weight, &c., of the secondary conducting-bars and end connectors must be such that the losses therein during low-speed running will not raise the temperature above a predetermined degree which represents satisfactory and safe conditions for a given period of operation. By increasing the amount of material in the secondary circuits, especially in the end rings, sufficiently to keep the temperature within the limits of safe operation the length of time during which the motor may be run at low speeds may be made as great as desired.

Referring now to the drawings, the primary member of the motor 1 comprises a frame 2, preferably of cast iron or steel, a laminated core 3, a winding 4, located in slots in the core, and suitable end plates 5, one of which only is shown in the drawings. All of the parts thus far enumerated may be of any preferred construction known in the art. The secondary member in this case is the rotating part and comprises a spider 6, a laminated core 7, provided with longitudinal slots 8, in which are located conducting-bars 9, which preferably project beyond the ends of the core and are suitably insulated, all as shown, for example, in my Patent No. 610,067.

The resistance-rings 10, preferably one at each end of the machine, are made of comparatively large cross-section, so as to afford much heat-storing capacity, and each is connected to the corresponding ends of the conducting-bars 9 by means of radial or substantially radial arms 11, the upper ends of these arms being bolted to the corresponding ends of the conductors 9, preferably by the means shown and described in my patent above referred to for bolting the resistance-ring to the ends of the conductor-bars. Certain of these arms 11 may be provided with shoulders for engagement with a projection $7^a$ on the spider for the purpose of affording additional support and steadying the ring 10. These arms 11 are shown as cast integral with the ring, and while this is in some respects a preferable form they may be separately formed and bolted or otherwise fastened to the ring. These arms are employed in order to provide the necessary amount of resistance for starting and running at low speeds, since the ring alone if made of sufficient dimensions to store the heat due to losses during low speeds in the manner desired will not afford the necessary amount of resistance. The arms 11 may be of such width as to constitute fan-blades for promoting circulation in order to keep down the temperature of the machine, and, if desired, additional fan-blades 12 may be provided, as indicated in Fig. 3.

While I have shown a form of apparatus suitable for practicing my invention, I desire it to be understood that the form, dimensions, and relation of parts may be varied within considerable limits, if desired.

I claim as my invention—

1. In an induction-motor, a secondary member comprising a frame, a slotted, laminated core supported thereby, conducting-bars located in the core-slots and projecting beyond the ends of the same, resistance-rings of large cross-sectional area, and substantially radial arms interposed between said rings and the corresponding ends of the conducting-bars said arms constituting the sole connection between the ring and the frame.

2. In an induction-motor, a secondary member comprising a slotted core, conducting-bars located in the core-slots and projecting beyond the ends of the same, an end ring of comparatively large cross-section and resistance bars or arms interposed between said ring and the corresponding ends of the conducting-bars and constituting the sole means for supporting said ring.

3. In an induction-motor, a secondary member comprising a slotted core, conducting-bars located in the core-slots and projecting beyond the ends of the same, rings having large heat-storing capacity, and comparatively high resistance connections between said rings and the corresponding ends of the conducting-bars, said connections constituting the sole supporting means for said rings.

4. In an induction-motor, a secondary member comprising a slotted core, bar-conductors located in the core-slots, conducting-rings of large heat-storing capacity respectively provided with arms equal in number to the bar-conductors and fastened thereto, said arms constituting the sole supporting means for said rings.

5. An induction-motor comprising a primary member having a distributed winding and a secondary member having a slotted core, bar-conductors located in the core-slots, resistance-rings of large heat-storing capacity and conducting-arms between bar-conductors and the resistance-rings and constituting the sole supporting means for said rings, all constructed and operating to store heat when running at low speeds and to dissipate such heat when running at relatively high speeds.

In testimony whereof I have hereunto subscribed my name this 17th day of May, 1899.

BENJ. G. LAMME.

Witnesses:
JAMES B. YOUNG,
H. C. TENER.